United States Patent
Dillenberger et al.

(10) Patent No.: US 9,436,721 B2
(45) Date of Patent: Sep. 6, 2016

(54) OPTIMIZATION OF MIXED DATABASE WORKLOAD SCHEDULING AND CONCURRENCY CONTROL BY MINING DATA DEPENDENCY RELATIONSHIPS VIA LOCK TRACKING

(71) Applicant: International Business Machines Corporation, Armonk, NY (US)

(72) Inventors: Donna N. Dillenberger, Yorktown Heights, NY (US); Hubertus Franke, Cortlandt Manor, NY (US); Hong Min, Poughkeepsie, NY (US); Yefim Shuf, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 14/193,221

(22) Filed: Feb. 28, 2014

(65) Prior Publication Data

US 2015/0248452 A1 Sep. 3, 2015

(30) Foreign Application Priority Data

May 13, 2016 (NO) ............... FOREIGN PRIORITY (51) Int. Cl.
*G06F 17/30* (2006.01)

(52) U.S. Cl.
CPC ... *G06F 17/30362* (2013.01); *G06F 17/30306* (2013.01)

(58) Field of Classification Search
CPC .................. G06F 17/30306; G06F 17/30362; G06F 17/30371; G06F 17/30864; G06F 17/30867; G06F 17/30554; G06F 17/3087; G06F 17/30241; G06F 3/04842; G06F 17/30268; G06F 17/3028; G06F 1/3215; G06F 17/30011; G06F 17/30528
See application file for complete search history.

(56) References Cited

U.S. PATENT DOCUMENTS

| | | | | |
|---|---|---|---|---|
| 5,581,724 A | * | 12/1996 | Belsan | G06F 11/1076 711/113 |
| 5,835,910 A | * | 11/1998 | Kavanagh | G06F 9/4448 707/E17.005 |
| 6,415,259 B1 | | 7/2002 | Wolfinger et al. | |
| 6,735,760 B1 | * | 5/2004 | Dice | G06F 9/52 717/139 |

(Continued)

OTHER PUBLICATIONS

Mathieu Desnoyers, Paul E. McKenney, Alan S. Stern, Michel R. Dagenais, and Jonathan Walpole—"User-Level Implementations of Read-Copy Update"—IEEE Transactions on Parallel and Distributed Systems, vol. 23, No. 2, Feb. 2012—pp. 375-382.*

(Continued)

*Primary Examiner* — Anh Ly
(74) *Attorney, Agent, or Firm* — Scully, Scott, Murphy & Presser PC; Mercedes Hobson, Esq.

(57) ABSTRACT

The present disclosure relates generally to the field of determining data access patterns associated with different workloads. In various examples, determining data access patterns associated with different workloads may be implemented in the form of systems, methods and/or algorithms. The present disclosure also relates generally to the field of scheduling workloads (and/or recommending scheduling for workloads) based upon the determined data access patterns associated with the different workloads. In various examples, scheduling workloads (and/or recommending scheduling for workloads) may be implemented in the form of systems, methods and/or algorithms.

20 Claims, 6 Drawing Sheets

(56) References Cited

U.S. PATENT DOCUMENTS

| | | | | |
|---|---|---|---|---|
| 2006/0074970 | A1* | 4/2006 | Narayanan | G06F 11/3419 711/E11.002 |
| 2006/0230317 | A1* | 10/2006 | Anderson | G06F 11/3428 714/38.13 |
| 2008/0097960 | A1* | 4/2008 | Dias | G06F 17/30286 707/E17.005 |
| 2009/0249116 | A1* | 10/2009 | Bartfai | G06F 11/2066 714/6.12 |
| 2009/0282288 | A1* | 11/2009 | Wang | G06F 11/3612 714/37 |
| 2010/0191884 | A1* | 7/2010 | Holenstein | G06F 11/2094 707/613 |
| 2011/0113406 | A1* | 5/2011 | Flemming | G06F 11/3404 717/128 |
| 2011/0320745 | A1* | 12/2011 | Zhang | G06F 11/3636 711/154 |
| 2012/0159495 | A1 | 6/2012 | Rajagopalan et al. | |
| 2013/0125130 | A1* | 5/2013 | Stubbs | G06F 1/329 718/104 |
| 2014/0006358 | A1* | 1/2014 | Wang | G06F 17/30289 707/687 |
| 2014/0278649 | A1* | 9/2014 | Guerinik | G06Q 10/063116 705/7.16 |
| 2015/0153817 | A1* | 6/2015 | McKenney | G06F 9/5094 713/323 |
| 2015/0168936 | A1* | 6/2015 | Martinez Canedo | G06F 9/4887 700/20 |
| 2015/0286586 | A1* | 10/2015 | Yadav | G06F 9/528 711/152 |
| 2015/0339798 | A1* | 11/2015 | Peterson | G06F 9/52 345/520 |

OTHER PUBLICATIONS

Alexander Thomasian—"Restart-Oriented Locking Methods"—Database Concurrency Control—vol. 1 of the series the Springer International Series on Advances in Database Systems pp. 69-86.*

Gucer, V. et al.; "Getting Started with IBM Tivoli Workload Scheduler V8.3—Best Practices and Performance Improvements"; IBM Corporation; www.ibm.com/redbooks/sg24-7237-00; Oct. 2006.

Glicer, V. et al.; "Getting Started with Tivoli Dynamic Workload Broker Version 1.1"; IBM Corporation, www.ibm.com/redbooks/sg24-7442-00; Jul. 2007.

http://publib.boulder.ibm.com/infocenter/dzichelp/v2r2/index.jsp?topic=%2Fcom.ibm.db2z10.doc.dshare%2Fsrc%2Ftpc.%2Fdb2z_lockmonitordb2perftrace.htm, "Lock monitoring with the DB2 performance trace" printed Dec. 30, 2013.

"Data Sharing: Planning and Administration", 2013, pp. 1-260.

* cited by examiner

OPTIMIZATION OF MIXED DATABASE WORKLOAD SCHEDULING AND CONCURRENCY CONTROL BY MINING DATA DEPENDENCY RELATIONSHIPS VIA LOCK TRACKING

BACKGROUND

In a conventional data center (e.g., a cloud data center), there are typically different types of workloads run on servers or like computing devices. Examples include online transaction processing work and Batch work. Online transaction processing (sometimes referred to herein as "OLTP") work requires prompt response time to the end user. In contrast, batch work focuses on background processing of a large amount data (e.g., periodic processing).

Figure 1:
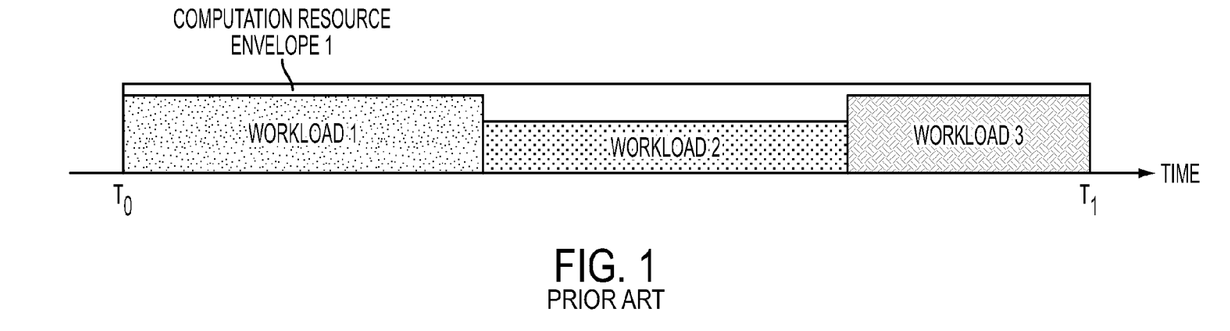
FIG. 1 depicts a diagram of conventional scheduling (that is, without having workloads overlap in time).

These different workloads are typically scheduled at different time windows (e.g., a different time window for each type of workload and/or a different time window for two or more of the same type of workload). In this regard see, for example, the scheduling of FIG. 1—where three workloads (Workload 1, Workload 2 and Workload 3) are scheduled at non-overlapping times in computational resource envelope 1 between $T_o$ and $T_1$. This is because the data dependency between the workloads is typically not clear. For example, applications are typically developed by different organizations or groups of people than the people responsible for system operations. Thus, the workloads are typically scheduled at different time windows such that concurrency issues and/or related performance issues can be "safely avoided" (e.g., without having an appropriate understanding of low level data access dependency and contention). Further, Batch work may be broken into one or more steps (and this typically cannot be accomplished without human involvement). Traditional business process patterns have also made this separating (such as scheduling at different time windows) possible and relatively easy to manage.

However, significant data and application growth in recent years, as well as business process changes, have put significant challenges on the traditional coarse level scheduling approach such as separating OLTP and Batch time windows. There have been more and more cases when certain work can not be contained in scheduled time windows. For example, a larger amount of Batch data may require one or more Batch time windows to be widened. In another example, business growth from regional to nationwide or from nationwide to international of a banking institution widens the OLTP time window for business reasons and consequently shrinks the batch time window.

In this regard, technology development has enabled more and different concurrency control mechanisms, if there is enough understanding of application data access patterns.

From a data center operation perspective, in order to adapt to new business process patterns and optimize operations, learning and better understanding of data access dependency is necessary. This is also very challenging to do when operation, application development and business processing development are in different organizations of a company, or even different companies (e.g., due to business outsourcing). Another aspect of learning is to understand the workload patterns during different times. For example, although Internet banking is enabled 24 hours a day, it does not means the OLTP workload distributes evenly in the 24 hour window. Geographical population distribution and end users' biological patterns and life styles may directly influence a data centers' workload patterns.

SUMMARY

The present disclosure relates generally to the field of determining data access patterns associated with different workloads. In various examples, determining data access patterns associated with different workloads may be implemented in the form of systems, methods and/or algorithms.

The present disclosure also relates generally to the field of scheduling workloads (and/or recommending scheduling for workloads) based upon the determined data access patterns associated with the different workloads. In various examples, scheduling workloads (and/or recommending scheduling for workloads) may be implemented in the form of systems, methods and/or algorithms.

In one embodiment a method for workload scheduling is provided, the method comprising: obtaining, by a processor, lock trace data associated with a plurality of workloads; replaying, by the processor, the lock trace data associated with the workloads to identify at least one data access conflict between a first one of the workloads and a second one of the workloads; decomposing, by the processor, based at least in part upon the at least one identified data access conflict, at least the first one of workloads into a plurality of shorter duration execution units; and scheduling, by the processor, at least one of the shorter duration execution units at a time window that at least partially overlaps a time window of at least the second one of the workloads.

In another embodiment a computer readable storage medium, tangibly embodying a program of instructions executable by the computer for workload scheduling is provided, the program of instructions, when executing, performing the following steps: obtaining lock trace data associated with a plurality of workloads; replaying the lock trace data associated with the workloads to identify at least one data access conflict between a first one of the workloads and a second one of the workloads; decomposing, based at least in part upon the at least one identified data access conflict, at least the first one of workloads into a plurality of shorter duration execution units; and scheduling at least one of the shorter duration execution units at a time window that at least partially overlaps a time window of at least the second one of the workloads.

In another embodiment a computer-implemented system for workload scheduling is provided, the system comprising: an obtaining element configured to obtain lock trace data associated with a plurality of workloads; a replaying element configured to replay the lock trace data associated with the workloads to identify at least one data access conflict between a first one of the workloads and a second one of the workloads; a decomposing element configured to decompose, based at least in part upon the at least one identified data access conflict, at least the first one of workloads into a plurality of shorter duration execution units; and a scheduling element configured to schedule at least one of the shorter duration execution units at a first time window that at least partially overlaps a second time window of at least the second one of the workloads.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

As described herein, an approach is provided for determining data access patterns associated with different workloads. Such data access patterns may be determined by tracking access requests of the different workloads to, for example, a database's concurrency control component mechanism (in one specific example, the database's concurrency control component mechanism may be a database lock manager). In another specific example, access patterns may be determined between different OLTP applications or determined between different batch applications.

By tracing target objects (e.g., database table, page, and/or record (row)) of each request from each workload, each request type (e.g., access intent such as read or write) from each workload, time of each workload and/or duration of each workload, various analysis can be conducted on the access patterns (e.g., temporal access patterns and/or spatial access patterns (such as accessing objects within logical or physical proximity from each other—for example, this can mean location conflict such as both workloads access the same record; or two workloads access two different records on the same page)). In addition, simulations can be performed by replaying the workload traces in time series, e.g., with overlapping time windows (of note, since a lock is typically in a hierarchy from table->page->row, the granularity of the simulation and analysis can be adjusted (the data is easiest to aggregate at table level but may be less useful than finer grain)). Based on such playback, various observations and decisions (such as analysis of aggregated conflict patterns among the different workload) may be made. In addition, various recommendations (e.g., related to fine grain scheduling, concurrency control mechanism/tuning choices, and physical database design changes) may be made.

For example, based on such simulations and analysis, various observations and decisions associated with the following operational aspects may be made: (1) Can different workloads run concurrently? (2) How heavy is data conflict (e.g., the aggregated conflict count and duration; is conflict ratio exceeding a certain defined threshold?) when different workload traces are played back together with overlapping time series? (3) What are the data conflict patterns in terms of temporal, spatial (e.g., physical location of data of the conflicts), and access intents (e.g., including read or write) and what are the most suitable concurrency control options (e.g., to share or exclusive, fully or optimistic; e.g., such as fully locking, or optimistic lock free or other approach) for the observed patterns and frequencies? (4) What are the most suitable concurrency access tuning options (e.g., whether the lock should be on a row/record, on page (multiple records) or the entire table or a partition of the table; e.g., locking granularity)? (5) What is the most suitable physical database design (e.g., the database physical layout such as page size, lock level) to minimize access conflict? (6) Should there be prioritization among workloads in terms of object access and fine grain scheduling when there is access conflict? And if so, and how (e.g., when conflict happens), should the priority of granting access be given to some workload(s) over other(s)? (7) In an environment like a cloud data center, can one derive a price model for (6) above? And if so, what is the price model (e.g., setting up service level agreement for different workloads)?

Figure 2:
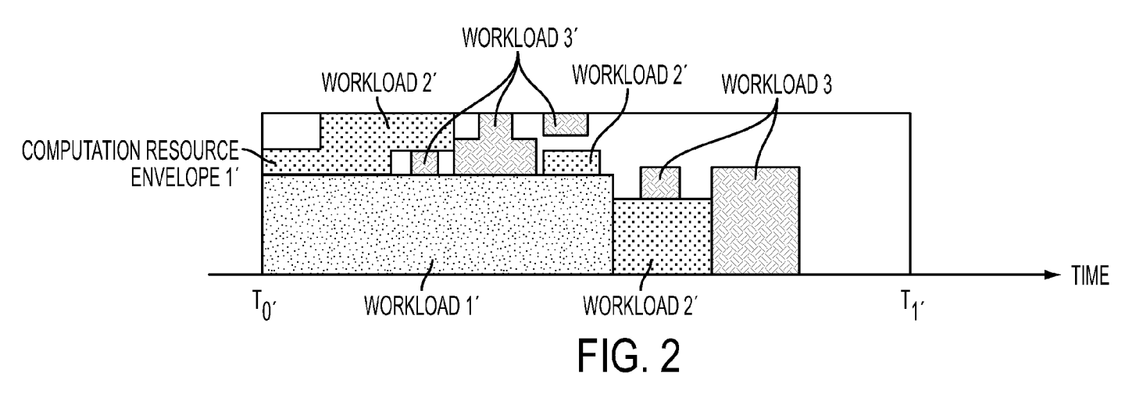
FIG. 2 depicts a diagram of a desirable type of scheduling (that is, having workloads overlap in time) according to an embodiment of the present invention.

In one specific example, scheduling of the type shown in FIG. 2 may be provided. As seen, there are three workloads (Workload 1', Workload 2' and Workload 3'). These workloads are scheduled at various overlapping times in computational resource envelope 1' between $T_o'$ and $T_1'$. As seen, this computational resource envelope 1' is increased relative to computational resource envelope 1 of FIG. 1 (that is, more workloads performed in a shorter amount of time) because of the capability of co-scheduling (provisioning more computation resources with respect to FIG. 1 would not necessarily help, because of the inability to have workloads overlap in time).

For the purposes of description the term "workload" is intended to refer to a computer process that is performed to serve an application purpose. Such a workload may be run a plurality of times in succession (e.g., an OLTP that is typically run as required by one or more end users or a Batch process that is typically run each night at after COB (close of business) or during designated one or more batch windows). In one specific example, a first workload may be a first OLPT application and a second workload may be a second OLPT application (wherein optimization is applied between the first and second OLPT applications). In another specific example, a first workload may be a first batch application and a second workload may be a second batch application (wherein optimization is applied between the first and second batch applications).

For the purposes of description the term "lock" (such as used in the term "lock tracing" or the term "lock trace data") is intended to refer to a data structure used to manage which workload entity can perform a particular type of operation on a particular lock target object and may indicate whether exclusively or in a shared fashion, for which period of time, etc. In a database system, for example, this is the mechanism that a database uses to ensure that a logical or physical object is protected from being corrupted or invalidated when multiple users try to read while others write to the database. For example, an exclusive lock on an object granted to one work request means no other work request can read or write the same object unless the lock is released. A shared lock means other work requests may also read or write to the object.

Figure 3:
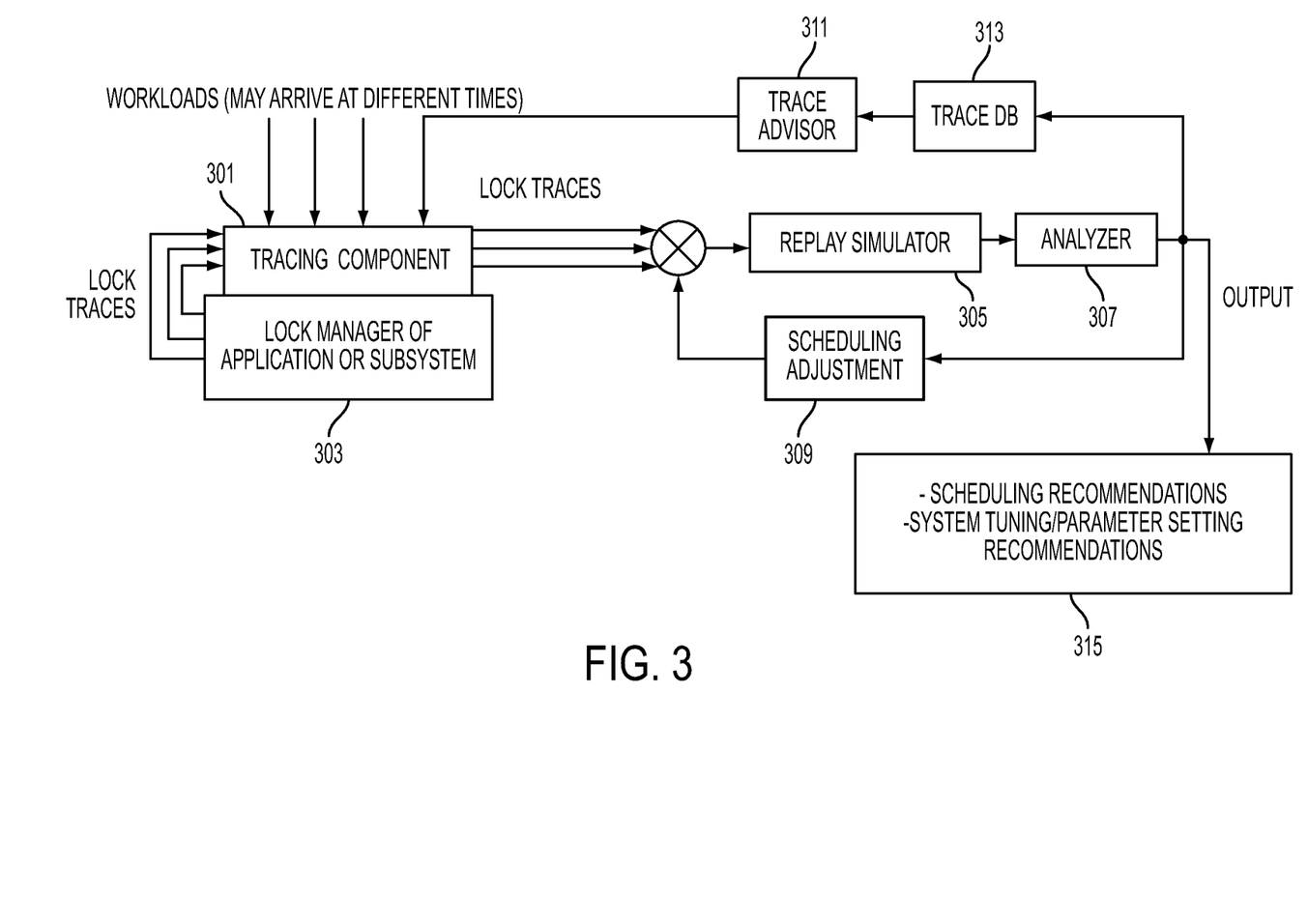
FIG. 3 depicts a block diagram of a system according to an embodiment of the present invention.

Referring now to FIG. 3, an example implementation that provides insight to data access (e.g., by OLTP and/or Batch processing) and that generates (e.g., automatically generates) scheduling suggestions according to an embodiment will be described. In this example implementation a tracing component 301 is provided to obtain lock traces of different workloads from the lock manager 303 of one or more applications and/or subsystems (in one example, this is to collect the trace data of lock request(s) during a period of time; in one example, the lock manager should have trace information on (a)-(e) below if it does not already exist; in another example, the trace capability allows filtering on just tracing certain object(s) during certain time window(s)). In one specific example, each lock trace may include data identifying: (a) the lock target object (this may be system configured and, in one example, may be at the lowest granularity possible); (b) the lock type; (c) the lock timestamp; (d) the lock duration; (e) the lock requestors in term of workload/application identifier; and/or a combination thereof. In another specific example, the element of FIG. 3 that receives the lock traces from the tracing component 301 (i.e., the X in the circle) may receive trace files generated by the lock manager, via the trace component, and may call, if available, an API (Application Programming Interface) of the lock manager for such information. In another specific example, the lock trace information may be stored in memory buffer(s) and/or file(s). In another specific example, there may be function APIs that provide access to the in-memory and/or in-file trace(s) (wherein one can use the APIs to retrieve trace information generated by lock manager).

Further, a replay simulator 305 is provided to receive lock trace data and: (a) replay lock traces from one or more workloads with various scheduling plans (that is, one or more different temporal scheduling plans (e.g., play both traces concurrently, or serially (one by one)); (b) identify data access conflicts (e.g., at a desired granularity); and (c) quantify as a "measure" access conflict(s) and/or performance (throughput)—this refers, for example, to how many conflicts(s), how much performance impact does each scheduling cause on individual applications due to data conflict). In one example, replay simulator 305 is a component to generate simulated request(s). For example, a duration of T hours trace is collected during OLTP day time processing. Another trace of T hours from night batch workload is also collected. In the replay simulator, both traces are played back.

Further still, an analyzer 307 is provided that can: ((a) identify temporal dependencies of data accesses among different workloads; and (b) decompose these workloads into multiple smaller execution units for finer grain scheduling (e.g., for smaller time window scheduling). In one example, the analyzer 307 is a component/function that looks into the conflict information provided by the replay simulator and determines the detail level data conflict to see if better scheduling would provide benefit.

Further still, a feedback mechanism (see scheduling adjustment 309) is provided that can take the "measure" from the replay simulator and the identified temporal dependencies analysis from the analyzer and adjust the scheduling of the workloads to optimize the "measure" (e.g. reduce the conflicts). In one specific example, this may be done by analyzing one or more object dependency graphs (e.g., using conventional graph analysis techniques). In one example, the feedback mechanism (see scheduling adjustment 309) is a component that uses the information from previous step to change or fine tune the scheduling. For example, if the beginning of both OLTP trace and batch trace show a lot of conflict, maybe the adjustment is not to completely overlap them.

Further still, a feedback mechanism (see trace advisor 311) is provided that can take the analysis from the analyzer and adjust the trace setting (e.g., using data from a trace database 313) of the tracing component to be more targeted. In one example, the feedback mechanism (see trace advisor 311) could be that when it is identified that only certain table(s) or certain partition(s) demonstrate heavy conflicts, during the next trace iteration, only lock traces on those objects are collected.

In one specific example, the optimized fine grain scheduling that is based on the simulation can be output and can be used to impact the scheduling of workloads in real-time and/or in the future. In another specific example, one or more recommendations (e.g., a best recommendation; e.g., such as when to give priority to one application over the other or when to suspend one workload so the other one will process through) on scheduling and/or system level settings such as related to contention resolution (see, e.g., output 315) are generated as advice to the system and/or administrators. In one example, scheduling and/or system level settings may relate to provisioning more resources when contention is no longer an issue; or provisioning more threads for certain work such as I/O processing.

Figure 4:
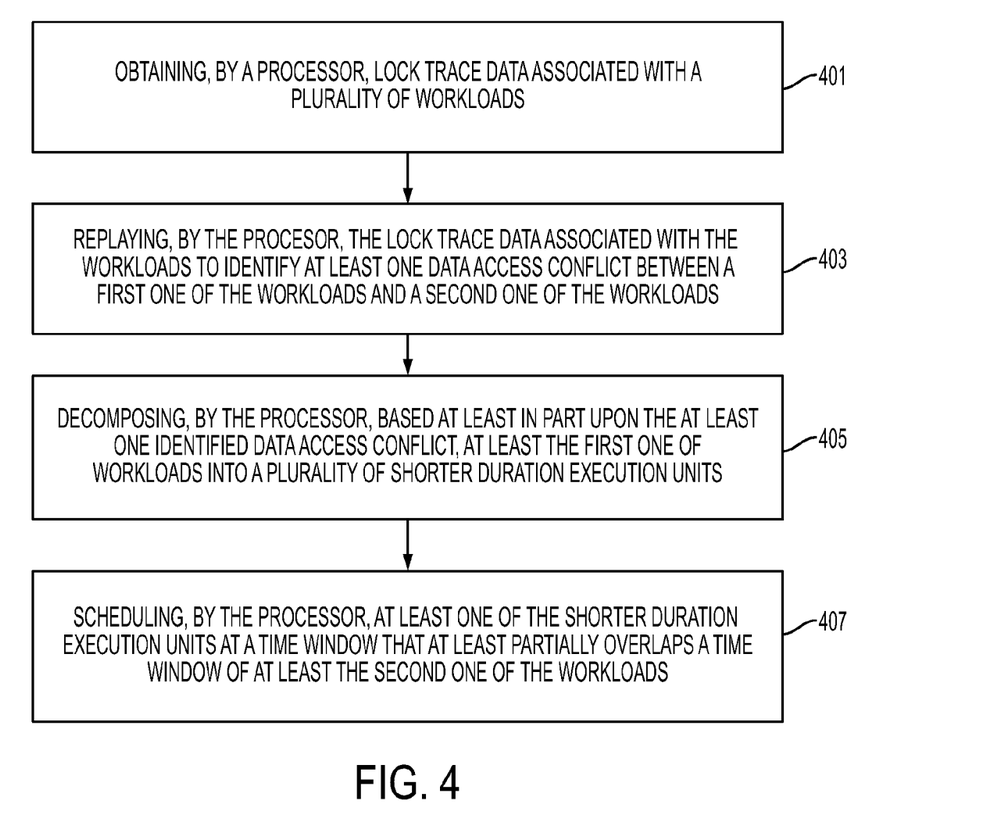
FIG. 4 depicts a block diagram of a method according to an embodiment of the present invention.

Referring now to FIG. 4, a method for workload scheduling is shown. As seen in FIG. 4, the method of this embodiment comprises: at 401—obtaining, by a processor, lock trace data associated with a plurality of workloads; at 403—replaying, by the processor, the lock trace data associated with the workloads to identify at least one data access conflict between a first one of the workloads and a second one of the workloads; at 405—decomposing, by the processor, based at least in part upon the at least one identified data access conflict, at least the first one of workloads into a plurality of shorter duration execution units; and at 407—scheduling, by the processor, at least one of the shorter duration execution units at a time window that at least partially overlaps a time window of at least the second one of the workloads.

In one example, any steps may be carried out in the order recited or the steps may be carried out in another order.

Figure 5:
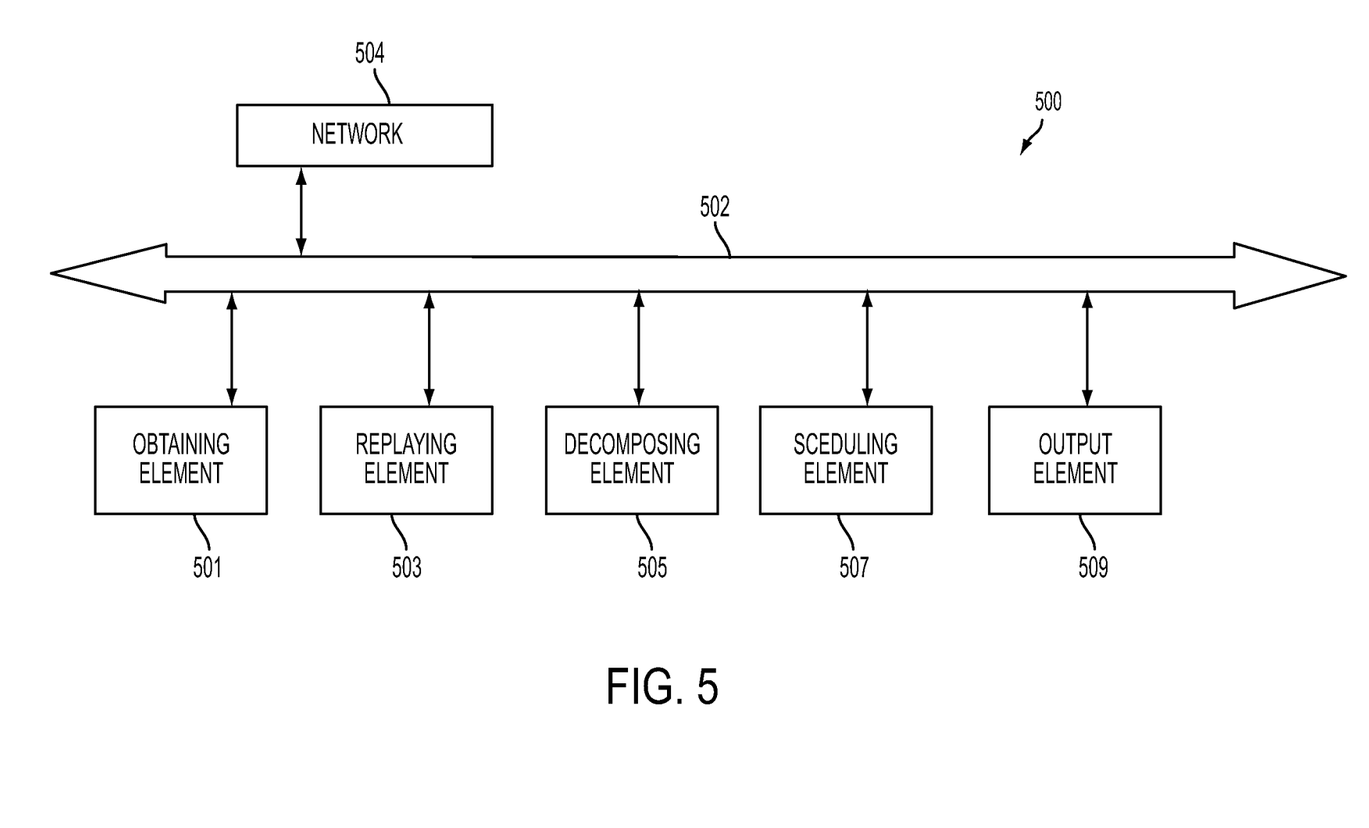
FIG. 5 depicts a block diagram of a system according to an embodiment of the present invention.

Referring now to FIG. 5, in another embodiment, a computer system 500 for workload scheduling is provided. This computer system may include the following elements: an obtaining element 501 configured to obtain lock trace data associated with a plurality of workloads; a replaying element 503 configured to replay the lock trace data associated with the workloads to identify at least one data access conflict between a first one of the workloads and a second one of the workloads; a decomposing element 505 configured to decompose, based at least in part upon the at least one identified data access conflict, at least the first one of workloads into a plurality of shorter duration execution units; a scheduling element 507 configured to schedule at least one of the shorter duration execution units at a first time window that at least partially overlaps a second time window of at least the second one of the workloads; and an output element 509 configured to output the schedule of the at least one of the shorter duration execution units at the first time window that at least partially overlaps the second time window.

Still referring to FIG. 5, each of the elements may be operatively connected together via system bus 502. In one example, communication between and among the various elements may be bi-directional. In another example, communication may be carried out via network 504 (e.g., the Internet, an intranet, a local area network, a wide area network and/or any other desired communication channel(s)). In another example, some or all of these elements may be implemented in a computer system of the type shown in FIG. 6.

Figure 6:
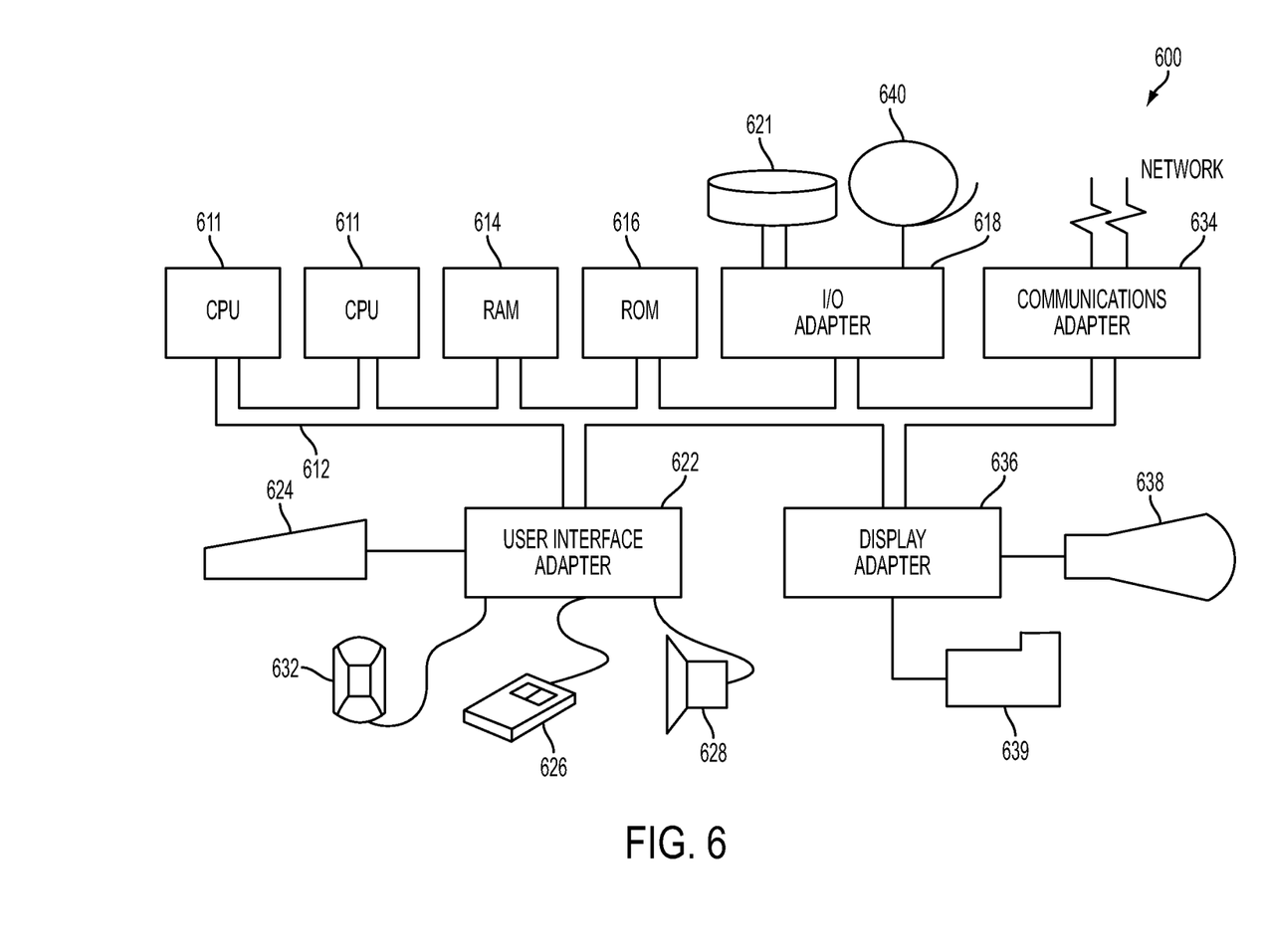
FIG. 6 depicts a block diagram of a system according to an embodiment of the present invention.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 7:
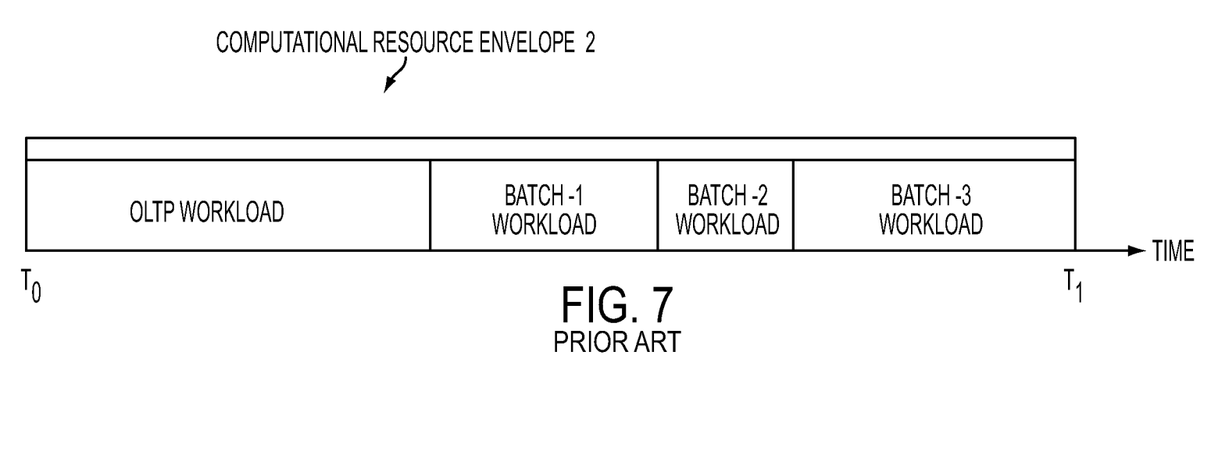
FIG. 7 depicts a diagram of conventional scheduling (that is, without having workloads overlap in time).
Figure 8:
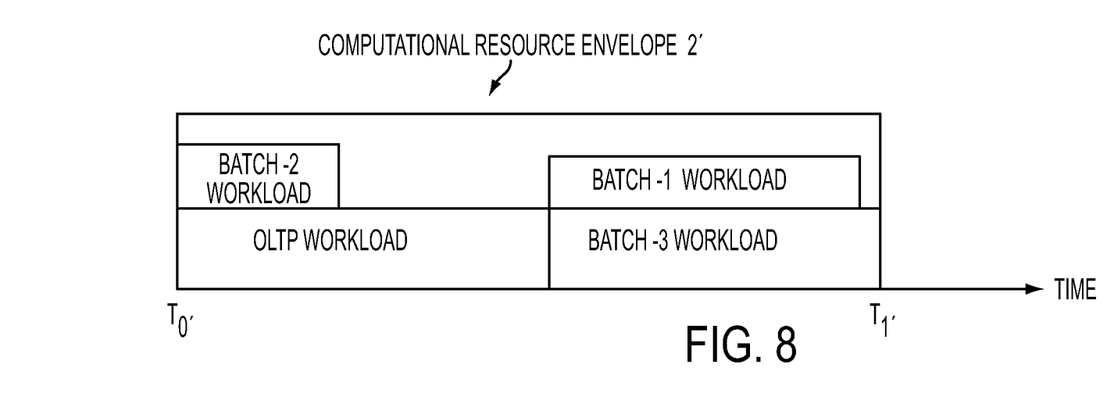
FIG. 8 depicts a diagram of a desirable type of scheduling (that is, having workloads overlap in time) according to an embodiment of the present invention.

In another specific example, scheduling of the type shown in FIG. 8 may be provided. As seen, there are four workloads (OLTP Workload, Batch_1 workload, Batch_2 workload and Batch_3 workload). In this specific example, it can be detected that a conflict exists between OLTP Workload and Batch_1 workload but not between OLTP Workload and Batch_2 workload or between Batch_1 workload and Batch_3 workload. The OLTP Workload and Batch_2 workload may then be scheduled to run concurrently and after that, Batch_1 workload and Batch_3 workload may be scheduled to run concurrently. These workloads are scheduled at various overlapping times in computational resource envelope 2' between $T_o$ and $T_1$. As seen, this computational resource envelope 2' is increased relative to computational resource envelope 2 of FIG. 7 (that is, more workloads performed in a shorter amount of time) because of the capability of co-scheduling (provisioning more computation resources with respect to FIG. 7 would not necessarily help, because of the inability to have workloads overlap in time).

In another example, a model may be provided for different concurrency control mechanisms as input to a tool. For example, some databases support different concurrency control mechanisms, such as serialization or timestamp ordering. In one example, the supported mechanisms can be used in the replay simulator/analyzer to decide what is most appropriate.

In one embodiment a method for workload scheduling is provided, the method comprising: obtaining, by a processor, lock trace data associated with a plurality of workloads; replaying, by the processor, the lock trace data associated with the workloads to identify at least one data access conflict between a first one of the workloads and a second one of the workloads; decomposing, by the processor, based at least in part upon the at least one identified data access conflict, at least the first one of workloads into a plurality of shorter duration execution units; and scheduling, by the processor, at least one of the shorter duration execution units at a time window that at least partially overlaps a time window of at least the second one of the workloads.

In one example, the first workload is a first application and the second workload is a second application that is different from the first application.

In another example: (a) each of the first and second applications is an OLTP application; or (b) each of the first and second applications is a Batch processing application.

In another example, the lock trace data is obtained from at least one of: (a) one or more application lock managers; (b) one or more subsystem lock managers; or (c) a combination thereof.

In another example, each of the workloads has associated therewith respective lock trace data.

In another example, the lock trace data comprises at least one of: (a) a lock target object; (b) a lock type; (c) a lock timestamp; (d) a lock duration; and (e) a combination thereof.

In another example, the replay of lock trace data comprises replaying the lock trace data a plurality of times, each time with a different temporal scheduling plan.

In another example, the replay of lock trace data identifies at least one data access conflict at a desired granularity selected from a plurality granularities.

In another example, the selected granularity comprises one of: (a) database table; (b) database page; (c) database record; (d) a database column; (e) a database; (f) a data set; (g) a collection thereof that has some association among them either logical or via referential integrity constraints; or (h) any combination thereof.

In another embodiment a computer readable storage medium, tangibly embodying a program of instructions executable by the computer for workload scheduling is provided, the program of instructions, when executing, performing the following steps: obtaining lock trace data associated with a plurality of workloads; replaying the lock trace data associated with the workloads to identify at least one data access conflict between a first one of the workloads and a second one of the workloads; decomposing, based at least in part upon the at least one identified data access conflict, at least the first one of workloads into a plurality of shorter duration execution units; and scheduling at least one of the shorter duration execution units at a time window that at least partially overlaps a time window of at least the second one of the workloads.

In one example, the first workload is a first application and the second workload is a second application that is different from the first application In another example: (a) each of the first and second applications is an OLTP application; or (b) each of the first and second applications is a Batch processing application.

In another example, the lock trace data is obtained from at least one of: (a) one or more application lock managers; (b) one or more subsystem lock managers; or (c) a combination thereof.

In another example, each of the workloads has associated therewith respective lock trace data.

In another embodiment a computer-implemented system for workload scheduling is provided, the system comprising: an obtaining element configured to obtain lock trace data associated with a plurality of workloads; a replaying element configured to replay the lock trace data associated with the workloads to identify at least one data access conflict between a first one of the workloads and a second one of the workloads; a decomposing element configured to decompose, based at least in part upon the at least one identified data access conflict, at least the first one of workloads into a plurality of shorter duration execution units; and a scheduling element configured to schedule at least one of the shorter duration execution units at a first time window that at least partially overlaps a second time window of at least the second one of the workloads.

In one example, the first workload is a first application and the second workload is a second application that is different from the first application.

In another example: (a) each of the first and second applications is an OLTP application; or (b) each of the first and second applications is a Batch processing application.

In another example, the lock trace data is obtained from at least one of: (a) one or more application lock managers; (b) one or more subsystem lock managers; or (c) a combination thereof.

In another example, each of the workloads has associated therewith respective lock trace data.

In another example, the system further comprises an output element configured to output the schedule of the at least one of the shorter duration execution units at the first time window that at least partially overlaps the second time window.

In one specific example, a shorter duration execution unit may comprise: a job step in batch or a committed unit of work in any application.

In one specific example, a different temporal scheduling plan may comprise: (a) different granularity in terms of breaking down a workload into smaller units of work; and/or (b) multiple units of work can be scheduled serially or concurrently.

In one specific example, various functions described herein may be carried out by a processor and software. In another specific example, various functions described herein may be carried out by a special dedicated hardware (HW) device or hardware accelerator.

In other examples, any steps described herein may be carried out in any appropriate desired order.

As described herein, mechanisms are provided for reducing the use of non-overlapping time windows in connection with OLTP and/or Batch processing time windows (that is, reducing the use of temporally separating jobs). In various specific examples, reducing the use of non-overlapping time windows may be performed by automatically detecting parts of various jobs (OLTP and/or Batch processing jobs) that can be run in parallel and/or that have no dependencies.

As described herein, mechanisms are provided for answering the question (by better understanding data access patterns and contentions) of whether different workloads can be scheduled in the same time windows. In one specific example, this question may be answered even if the underlying application (e.g., software application) details are not known or understood.

In another example, mechanisms may be provided for provisioning more computational resources when such additional provisioning might be useful.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for workload scheduling, the method comprising:
   obtaining, by a processor, first lock trace data associated with a plurality of workloads, the first lock trace data relating to a first set of objects;
   replaying, by the processor, the first lock trace data associated with the workloads to identify first data access conflicts between a first one of the workloads and a second one of the workloads;
   determining by the processor, based upon the identified first data access conflicts associated with the first lock trace data, a subset of the first set of objects;
   obtaining, by the processor, second lock trace data associated with the workloads, the second lock trace data relating to the subset of objects;
   replaying, by the processor, the second lock trace data associated with the workloads to identify second data access conflicts between the first one of the workloads and the second one of the workloads;
   decomposing by the processor, based at least in part upon the identified second data access conflicts, at least the first one of the workloads into a plurality of shorter duration execution units; and
   scheduling, by the processor, at least one of the shorter duration execution units at a first time window that at least partially overlaps a second time window of at least the second one of the workloads.

2. The method of claim 1, wherein the first workload is a first application and the second workload is a second application that is different from the first application.

3. The method of claim 2, wherein:
   (a) each of the first and second applications is an OLTP application; or
   (b) each of the first and second applications is a Batch processing application.

4. The method of claim 1, wherein each of the first and second lock trace data is obtained from at least one of: (a) one or more application lock managers; (b) one or more subsystem lock managers; or (c) a combination thereof.

5. The method of claim 1, wherein each of the workloads has associated therewith respective first and second lock trace data.

6. The method of claim 1, wherein each of the first and second lock trace data comprises at least one of: (a) a lock target object; (b) a lock type; (c) a lock timestamp; (d) a lock duration; and (e) a combination thereof.

7. The method of claim 1, wherein the replay of the first and second lock trace data identifies at least one data access conflict at a desired granularity selected from a plurality granularities.

8. The method of claim 7, wherein the selected granularity comprises one of: (a) database table; (b) database page; (c) database record; (d) a database column; (e) a database; (f) a data set; (g) a collection thereof that has some association among them either logical or via referential integrity constraints; or (h) any combination thereof.

9. The method of claim 1, wherein:
   each of the objects of the first set of objects and each of the objects of the subset of objects is a table;
   each of the objects of the subset of objects is one of the tables of the first set of objects; and
   the second lock trace data relates to the tables of the subset of objects but not to the tables of the first set of objects.

10. The method of claim 1, wherein:
    each of the objects of the first set of objects and each of the objects of the subset of objects is a partition; and
    each of the objects of the subset of objects is one of the partitions of the first set of objects; and
    the second lock trace data relates to the partitions of the subset of objects but not to the partitions of the first set of objects.

11. The method of claim 1, wherein the objects in the subset of objects are determined based upon an amount of the first data access conflicts associated with the first set of objects.

12. The method of claim 1, wherein the objects in the first set of objects and the objects in the subset of objects are database objects.

13. A computer readable storage medium, tangibly embodying a program of instructions executable by the computer for workload scheduling, the program of instructions, when executing, performing the following steps:
    obtaining first lock trace data associated with a plurality of workloads, the first lock trace data relating to a first set of objects;
    replaying the first lock trace data associated with the workloads to identify first data access conflicts between a first one of the workloads and a second one of the workloads;

determining, based upon the identified first data access conflicts associated with the first lock trace data, a subset of the first set of objects;

obtaining second lock trace data associated with the workloads, the second lock trace data relating to the subset of objects, replaying the second lock trace data associated with the workloads to identify second data access conflicts between the first one of the workloads and the second one of the workloads;

decomposing, based at least in part upon the identified second data access conflicts, at least the first one of the workloads into a plurality of shorter duration execution units; and scheduling at least one of the shorter duration execution units at a first time window that at least partially overlaps a second time window of at least the second one of the workloads.

14. The computer readable storage medium of claim 13, wherein the first workload is a first application and the second workload is a second application that is different from the first application.

15. The computer readable storage medium of claim 14, wherein:
(a) each of the first and second applications is an OLTP application; or
(b) each of the first and second applications is a Batch processing application.

16. The computer readable storage medium of claim 13, wherein each of the first and second lock trace data is obtained from at least one of: (a) one or more application lock managers; (b) one or more subsystem lock managers; or (c) a combination thereof.

17. A computer-implemented system for workload scheduling, the system comprising:
a processor; and
a memory storing computer readable instructions that, when executed by the processor, implement:

obtaining first lock trace data associated with a plurality of workloads, the first lock trace data relating to a first set of objects;

replaying the first lock trace data associated with the workloads to identify first data access conflicts between a first one of the workloads and a second one of the workloads;

determining, based upon the identified first data access conflicts associated with the first lock trace data, a subset of the first set of objects;

obtaining second lock trace data associated with the workloads, the second lock trace data relating to the subset of objects;

replaying the second lock trace data associated with the workloads to identify second data access conflicts between the first one of the workloads and the second one of the workloads;

decomposing, based at least in part upon the identified second data access conflicts, at least the first one of the workloads into a plurality of shorter duration execution units; and scheduling at least one of the shorter duration execution units at a first time window that at least partially overlaps a second time window of at least the second one of the workloads.

18. The system of claim 17, wherein:
(a) each of the first and second applications is an OLTP application; or
(b) each of the first and second applications is a Batch processing application.

19. The system of claim 17, wherein each of the first and second lock trace data is obtained from at least one of: (a) one or more application lock managers; (b) one or more subsystem lock managers; or (c) a combination thereof.

20. The system of claim 17, wherein the computer readable instructions, when executed by the processor, implement outputting the schedule of the at least one of the shorter duration execution units at the first time window that at least partially overlaps the second time window.

* * * * *